US012741167B2

(12) United States Patent
Frances et al.

(10) Patent No.: US 12,741,167 B2

(45) Date of Patent: Sep. 22, 2026

(54) SELF-CONTAINED FOAM-GENERATING DEVICE WITH BUILT-IN BREATHING APPARATUS

(71) Applicants: COMMISSARIAT À L'ENERGIE ATOMIQUE ET AUX ÉNERGIES ALTERNATIVES, Paris (FR); ARYBALLE, Grenoble (FR)

(72) Inventors: Fabien Frances, Saint-Julien-de-Peyrolas (FR); Pierre Venditti, Saint-Paulet-de-Caisson (FR); Célia Lepeytre, Rochefort-du-Gard (FR)

(73) Assignees: Commissariat à l'Energie Atomique et aux Énergies Alternatives, Paris (FR); Aryballe, Grenoble (FR)

(*) Notice: Subject to any disclaimer, the term of this patent is extended or adjusted under 35 U.S.C. 154(b) by 469 days.

(21) Appl. No.: 18/569,448

(22) PCT Filed: Jun. 14, 2022

(86) PCT No.: PCT/FR2022/051140

§ 371 (c)(1),
(2) Date: Dec. 12, 2023

(87) PCT Pub. No.: WO2022/263766

PCT Pub. Date: Dec. 22, 2022

(65) Prior Publication Data

US 2024/0207662 A1 Jun. 27, 2024

(30) Foreign Application Priority Data

Jun. 16, 2021 (FR) ....................................... 2106380

(51) Int. Cl.

*A62C 5/02* (2006.01)
*A62B 7/02* (2006.01)

(Continued)

(52) U.S. Cl.

CPC .................. *A62C 5/02* (2013.01); *A62B 7/02* (2013.01); *B01F 23/235* (2022.01);

(Continued)

(58) Field of Classification Search

CPC ..... A62C 5/02; A62C 13/00-78; A62C 15/00; A62C 17/00; A62C 19/00;

(Continued)

(56) References Cited

U.S. PATENT DOCUMENTS

2006/0211592 A1 9/2006 Faure et al.
2009/0260839 A1* 10/2009 Itano ...................... A62C 15/00 169/85
2021/0038926 A1 2/2021 Reedy

FOREIGN PATENT DOCUMENTS

CN 110251865 A * 9/2019 ............... A62B 9/02
CN 112206434 A 1/2021

(Continued)

OTHER PUBLICATIONS

Machine Translation CN110251865A accessed Apr. 28, 2026 (Year: 2026).*

(Continued)

*Primary Examiner* — Elliot S Ruddie

(74) *Attorney, Agent, or Firm* — McDonald Hopkins LLC

(57) ABSTRACT

A breathing apparatus for use by the operator, is supplied with compressed air also used to manufacture the foam to be generated on site, and optionally run a pneumatic pump sucking up the foaming liquid, using suitable regulators. An (Continued)

automatic shut-off device is added to automatically cut off the supply elsewhere than to the breathing apparatus when the quantity of air available becomes low.

4 Claims, 3 Drawing Sheets

(51) Int. Cl.

| | |
|---|---|
| ***B01F 23/235*** | (2022.01) |
| ***B05B 7/00*** | (2006.01) |
| ***B05B 7/24*** | (2006.01) |
| ***B08B 3/00*** | (2006.01) |

(52) U.S. Cl.
CPC .......... *B05B 7/0025* (2013.01); *B05B 7/2421* (2013.01); *B08B 3/003* (2013.01)

(58) Field of Classification Search
CPC .............. A62C 25/00–005; A62B 7/02; A62B 17/00–08; A62B 18/00–10; B01F 23/235; B05B 7/0025; B05B 7/2421; B05B 7/2475; B05B 12/004; B05B 7/2464; B05B 7/2472; B05B 7/267; B05B 7/0043; B08B 3/003; G21F 9/002
See application file for complete search history.

(56) References Cited

FOREIGN PATENT DOCUMENTS

| | | | |
|---|---|---|---|
| FR | 2 841 802 | A1 | 1/2004 |
| WO | 2013/067401 | A2 | 5/2013 |

OTHER PUBLICATIONS

Canadian Intellectual Property Office (CIPO), Notification of a Requisition by the Examiner for Patent Application No. 3,220,949, drafted Mar. 10, 2025, Canadian Patent Database, Canada.
International Search Report dated Sep. 28, 2022 issued in PCT/FR2022/051140.
Written Opinion dated Sep. 28, 2022 issued in PCT/FR2022/051140.
Search Report for French Application No. 2106380 dated Feb. 22, 2022.

* cited by examiner

SELF-CONTAINED FOAM-GENERATING DEVICE WITH BUILT-IN BREATHING APPARATUS

CROSS-REFERENCE TO RELATED APPLICATIONS

This is the National Stage application of PCT international application PCT/FR2022/051140, filed on Jun. 14, 2022, which claims the priority of French Patent Application No. 2106380, filed Jun. 16, 2021, both of which are incorporated herein by reference in their entireties.

The present invention relates to a self-contained foam-generating device with built-in breathing apparatus.

It is used in particular in decontamination or depollution work where foam has to be applied to large surfaces that can be sharply inclined or vertical, or in volumes, such as buildings or other stationary structures, which may be difficult to access, and remain on these surfaces for a sufficiently long time to act on the polluting substances without running or deteriorating in another way.

The foam can be viscosified, i.e. enriched with a gelling agent that increases the physical stability of the foam and makes it less likely to run off even very inclined or vertical surfaces. Examples are given in FR 2 841 802 A1. However, the invention is not limited to this specific foam.

One problem of these treatments, often carried out in a hostile environment, is that the operator may have to contend with toxic atmospheres due to the gas or fumes and therefore has to have respiratory support.

One example of a foam-generating device is described in WO 2013/067401 A2; this device is partially portable, designed to tackle fires, but does not have respiratory support.

CN110251865 A describes a foam-spraying device in which a compressed air cylinder which supplies the gaseous fraction of the foam also supplies a breathing mask via another conduit. An alarm device warns the user when the air is going to run out.

One object of the invention is to integrate respiratory support for the operator into the rest of the apparatus in better conditions than in the last document above, and in particular into the on-site manufacture of foam.

Other objects of the invention are:

- being able to transport the apparatus easily in places that are difficult to access and do not have any source of supply, such as water or electricity;
- and providing the operator with certain safety benefits.

According to a general definition, the invention relates to a foam-generating device, comprising a reservoir of foaming liquid, a container of compressed air, a first pipe leaving the reservoir and passing through a pump, being connected to suction and delivery ports of said pump, a second pipe leaving the container, the first pipe and the second pipe leading to a mixer of the foaming liquid and compressed air, wherein the foam is formed; the second pipe comprising a bifurcation, fitted with an atmospheric pressure expansion valve, which leads to a breathing apparatus intended for an operator of the device; characterized in that the second pipe is fitted with an obturator downstream of the bifurcation; and the obturator is associated with a compressed air pressure tap at the outlet of the container, which automatically closes the obturator when said pressure drops below a threshold.

The residual air is thus entirely allocated to the user's breathing, which improves their safety.

According to certain optional improvements:

- the bifurcation comprises a branch finishing at a valve of a quick coupling half, intended to connect to another breathing apparatus;
- the obturator is a valve pushed back by the compressed air in the pressure tap and pushed back in the opposite direction by a spring;
- the apparatus comprises a pressure gauge connected to the second pipe.

The invention will now be described in its various aspects, characteristics and advantages based on the following figures which show a specific embodiment provided purely for illustrative purposes:

Figure 6:
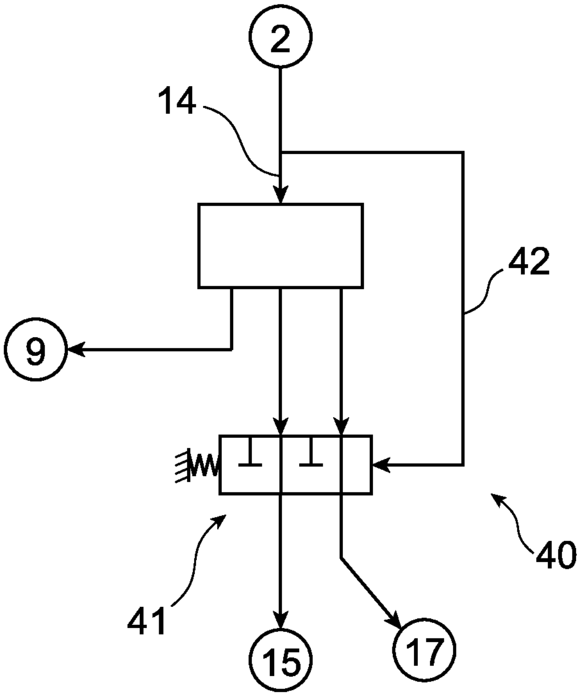

and FIG. 6 show another additional detail of the embodiment.

Figure 1:
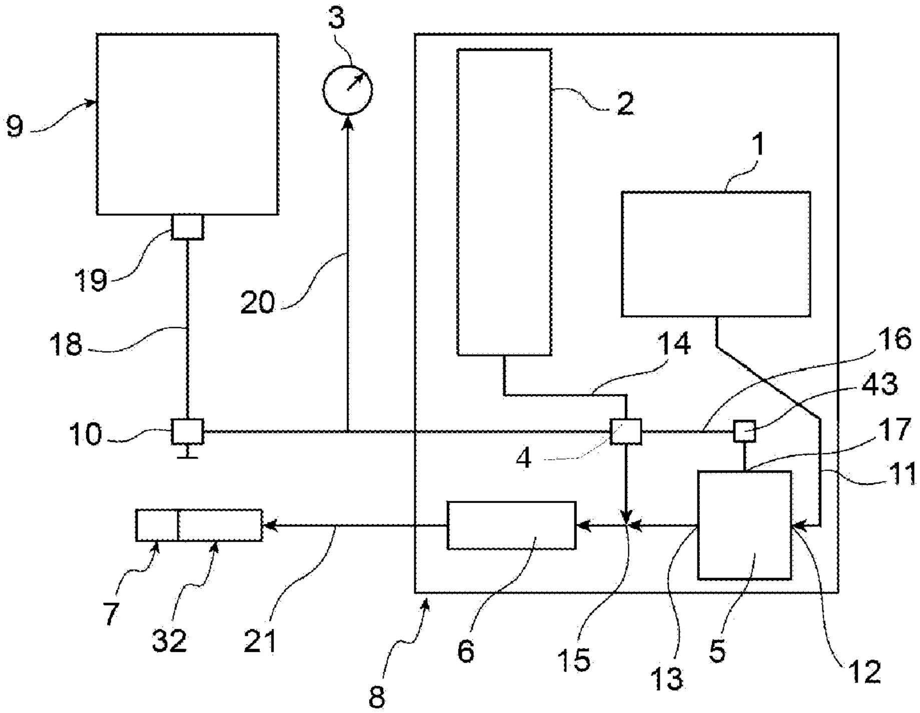
FIG. 1 is a schematic diagram of one embodiment of the invention.

With reference to FIG. 1, the apparatus comprises a reservoir 1 of liquid foam solution, a container such as a cylinder 2 of compressed air, a pressure gauge 3, a main expansion valve 4, a pneumatic pump 5, a mixer 6, a foam discharge end 7, a frame 8, a breathing mask 9 and a Y connection, 10. A first pipe 11 connects an outlet port of the reservoir 1 to a suction port 12 of the pneumatic pump 5; it exists the pneumatic pump 5 through its delivery port 13, passes through the mixer 6 and ends up at the end 7. A second pipe 14 connects an outlet port of the cylinder 2 to the main expansion valve 4, then joins the first pipe 11 at a junction 15 between the delivery port of the pneumatic pump 5 and the mixer 6. A bifurcation 16 of the second pipe 14 ends at a port 17 for moving the rotor of the pneumatic pump 5 (possibly via a second expansion valve 43 for independently regulating the pressure at this point); another bifurcation 18 leads to the breathing mask 9. As the main expansion valve 4 delivers compressed air at a pressure that is still much higher than the ambient pressure, the compressed air is supplied to the breathing mask 9 after having passed through a third expansion valve 19 at the exit of the bifurcation 18, which regulates the compressed air to 1 bar. The third expansion valve 19 can be integrated into the breathing mask 9. The bifurcations 16 and 18 leave the second pipe 14 just upstream of the main expansion valve 4 and therefore carry air that is only slightly compressed at constant pressure (7 bar for example). The pressure gauge 3 is connected via a pressure tap 20 to the second pipe 14, upstream of the main expansion valve 4, and it can therefore measure the pressure of the gas at the outlet the cylinder 2 and assess the filling thereof.

Figure 4:
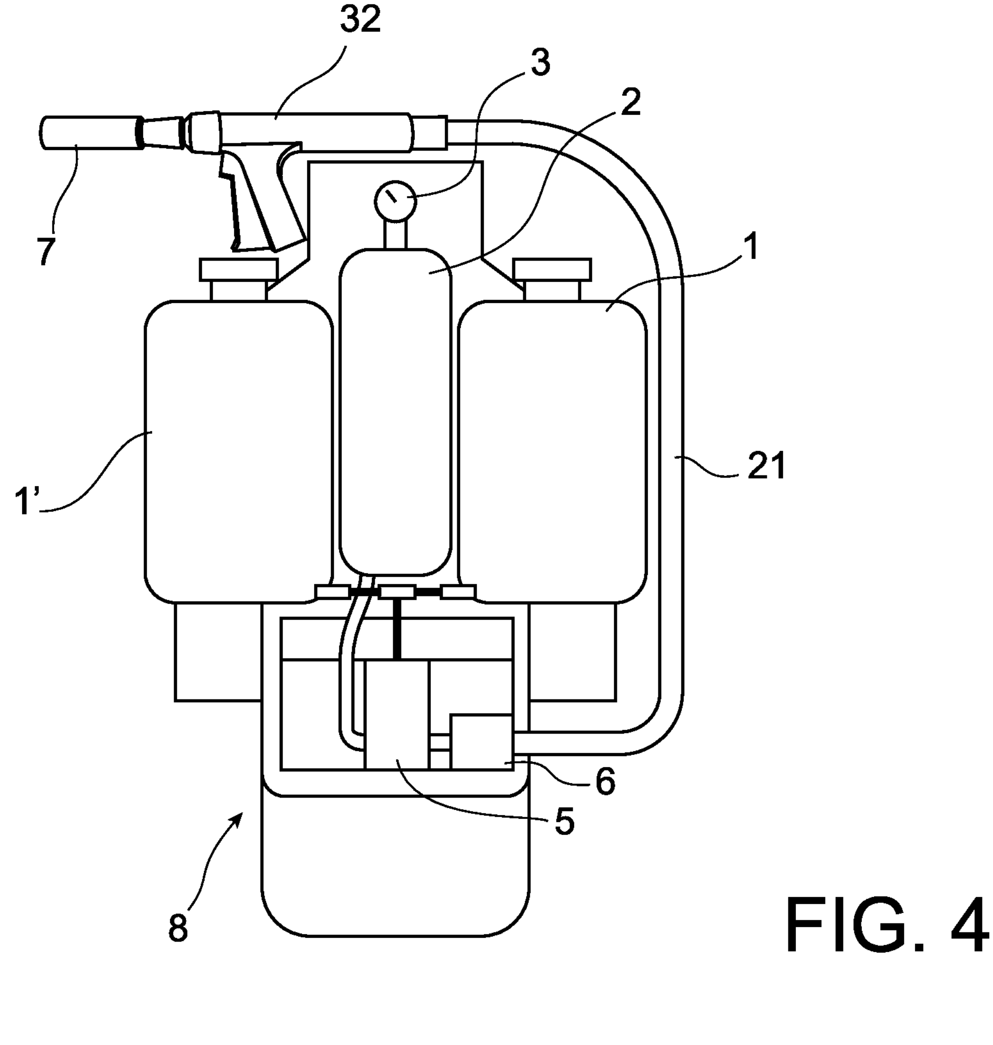
FIG. 4 shows a specific arrangement of the embodiment.

The frame 8 supports the reservoir 1, the cylinder 2, the main expansion valve 4, the pneumatic pump 5, at least one first portion of the first pipe 11 and the second pipe 14. As shown in FIG. 4, the frame 8 can be vertical and be part of a rucksack worn by the operator of the device; the frame 8 can also be a rolling trolley, for example. The breathing mask 9 is not fixed to the frame 8, and the bifurcation 18, at the end of which it is located, is flexible, which allows the operator to put on the breathing mask 9, or conversely to remove it. The foam discharge end 7 is not fixed to the frame 8 either, but is located at the end of a flexible nozzle 21, which the operator holds and which extends to the junction 15.

Figure 2:
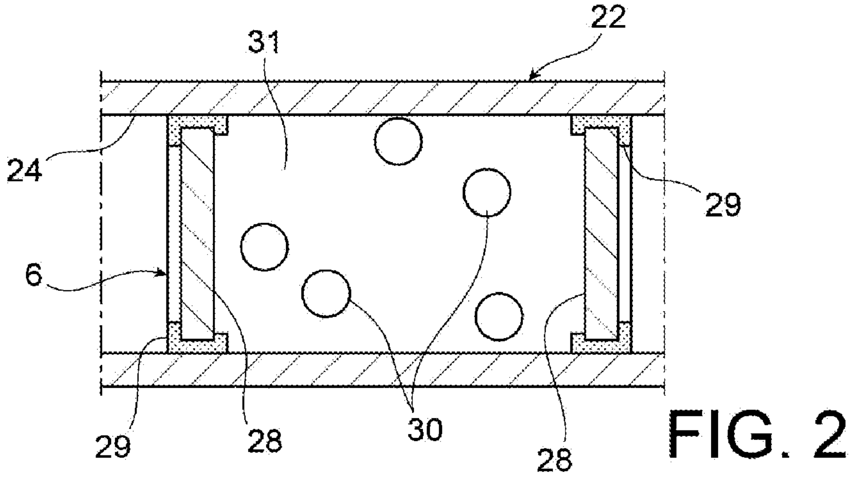
FIG. 2 shows the mixer.

The mixer 6 can be positioned upstream of the nozzle 21. It is shown in FIG. 2. It comprises two flat gates 28 arranged one after the other in the hole 24 of a cylindrical wall and occupying all its section, two seals 29 to which the gates 28 are respectively attached and which support them on the wall of the hole 24, and two spherical and rigid balls 30 free to move between the gates 28. The seals 29 are intended to hold the gates 28 in place and to form a cage 31 between them, delimited again by the wall of the hole 24, and in which the balls 30 are held. They also force all the fluids flowing in the hole 24 to pass through the inside of the cage 31. The mixer 6 thus defined can occupy the entire volume of the hole 24 or almost, i.e. the upstream gate 28 is close to the entrance of the hole 24, and the downstream gate 28 rests on the rear side of an end piece 26 which constitutes the end 7.

Other embodiments of the mixer 6 would also be suitable for implementing the invention.

Figure 3:
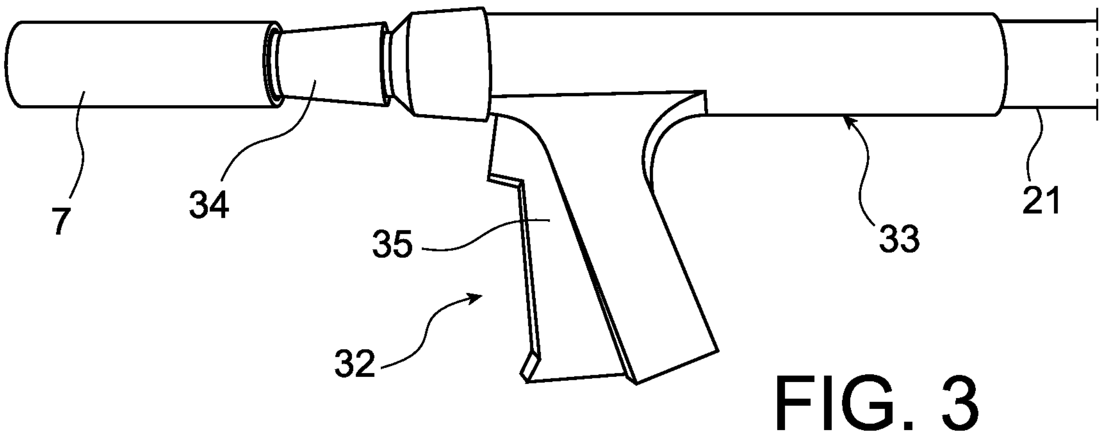
FIG. 3 shows the end of the spray gun.

FIG. 3 shows that the end 7 is attached to an end of a discharging tube 33 of a gun 32 held by the operator; the other end of the discharging tube 33 is attached to the nozzle 21. The operator releases the nozzle 21 by pressing on a trigger 35 of the gun 32. The breathing apparatus 9 is supplied regardless of the state of the trigger 35.

FIG. 4 shows a possible arrangement of the equipment on the frame 8, showing a spare reservoir 1' used when the first (the reservoir 1) has been emptied.

Figure 5:
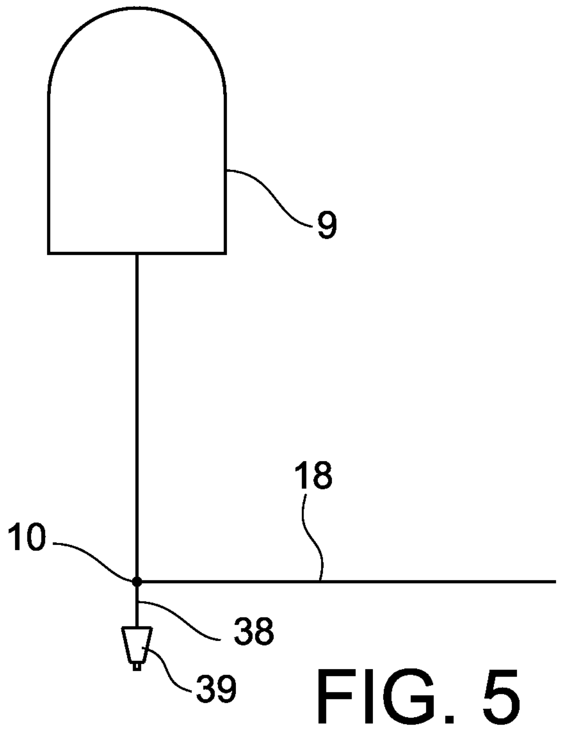
FIG. 5 shows an additional detail of the embodiment.

FIG. 5 shows that the bifurcation 18 is provided with a branch 38, which completes the Y connection 10, at the end of which a valve 39 of one of the halves of a quick coupling of a known type is placed. The branch 38 is intended to add a second breathing mask for another operator, identical to the breathing mask 9, or to connect to an air hose for assistance if needed: it suffices to couple a supply pipe for this mask, fitted with the other half of the quick coupling, to the valve 39.

FIG. 6 shows an additional safety enhancement, consisting of a switching device 40 which automatically cuts off the supply of compressed air to the pneumatic pump 5 and to the nozzle 21 when the cylinder 2 starts to empty and the air pressure at the outlet falls below a threshold in order to reserve the air for the operator wearing the breathing mask 9 to breath. A valve 41 controlling the supply to the pneumatic pump 5 and nozzle 21 is then switched to cut off the supply. Operation can be automatic if it is controlled by a pressure tap 42 of the second pipe 14 upstream of the main expansion valve 4, which presses on the valve 41 against the action of an opposing spring. Other embodiments of switching or automatic cut-off devices are possible; it is also possible to simply rely on the indications of the gauge 3.

This is how the device works and what its advantages are. As the device has no constraints, i.e. no supply from the outside, the operator can put it on or carry it unconstrained in remote or difficult to access locations. He grabs the nozzle 21 by the gun 32 and squeezes the trigger 35 when he is in front of the surface to be covered with foam. Releasing the nozzle 21 enables the compressed air to flow through the second pipe 14. Part of the flow passes through the pneumatic pump 5, activates it and is used to draw a constant flow of foam solution from the reservoir 1, proportional to the air flow through the pump 5. The pumped foam solution and the main flow of compressed air, which is directed towards the nozzle 21, merge at the junction 15, upstream of the mixer 6. Here too, the flow of the foam solution and that of the compressed air which mixes with it are proportional and therefore have an invariable relationship, determined by the physical characteristics of the fluids and the device. The foam forms by mixing the air with the foam solution, passing through the mixer 6. The gates 28, and in particular the balls 30, are very effective in obtaining a high-expansion foam, i.e. with a low liquid fraction.

Some additional information of a practical nature is provided below to describe in more detail a specific example of this embodiment of the device and its performance.

Cylinder 2: capacity of 3l, initial pressure of 300 bar;

Reservoir 1 or 1': capacity of 8l each;

Main expansion valve 4: reduces the pressure to 7 bar; Second expansion valve 43: reduces the pressure to 4 bar;

Foam solution: water, with Glucopon 215UP [BASF] at 10 g/l, and Xanthan Gum (G1253) [Sigma Aldrich] at 3 g/l;

Layer sprayed onto vertical surface: 10 $m^2$, 1 cm thick, in 120 s; sliding velocity less than 1 cm/min. If the foam is used to fill a volume, it must be maintained for at least 120 minutes;

Expansion of foam obtained: 16.7 (approximately 100 litres of foam produced for every 6 litres of foaming solution used).

The balls 30 could be replaced by another solid body that can move freely in the cage 31, and their number could also be different, a single solid body being feasible.

The invention claimed is:

1. A foam-generating device, comprising a reservoir of foaming liquid, a container of compressed air, a first pipe leaving the reservoir and passing through a pump, being connected to suction and delivery ports of said pump, a second pipe leaving the container, the first pipe and the second pipe leading to a mixer of the foaming liquid and compressed air, wherein the foam is formed; the second pipe comprising a bifurcation, fitted with an atmospheric pressure expansion valve, which leads to a breathing apparatus intended for an operator of the device, wherein the second pipe is fitted with an obturator downstream of the bifurcation, and wherein the obturator is associated with a compressed air pressure tap at an outlet of the container, which automatically closes the obturator when said pressure drops below a threshold, such that the compressed air is only delivered to the breathing apparatus.

2. The foam-generating device according to claim 1, wherein the bifurcation comprises a branch finishing at a valve of a quick coupling half, intended to connect to another breathing apparatus.

3. The foam-generating device according to claim 1, wherein the obturator is a valve pushed back by the compressed air in the pressure tap and pushed back in the opposite direction by a spring.

4. The foam-generating device according to one of claim 1, further comprising a gauge connected to the second pipe.

* * * * *